United States Patent Office 3,781,303
Patented Dec. 25, 1973

3,781,303
**METHOD OF PREPARING TRICYCLO-
HEXYLIDENE PEROXIDE**
Paul R. Story and Peter Busch, Athens, Ga., assignors to
Story Chemical Corporation
No Drawing. Filed June 29, 1970, Ser. No. 50,963
Int. Cl. C07d 19/00
U.S. Cl. 260—338                                1 Claim

ABSTRACT OF THE DISCLOSURE

A method for the preparation of mixed tricyclohexylidene peroxide and dicyclohexylidene peroxide or dicyclohexylidene peroxide alone comprising reacting a peroxide selected from the group consisting of 1-hydroperoxy 1'-hydroxydicyclohexyl peroxide and 1,1'-dihydroperoxydicyclohexyl peroxide with an organic solvent and a strong acid catalyst. Another method is disclosed for the preparation of tricyclohexylidene peroxide and dicyclohexylidene peroxide or tricyclohexylidene alone comprising reacting a peroxide selected from the group consisting of 1-hydroperoxy 1'-hydroxydicyclohexyl peroxide and 1,1'-dihydroperoxydicyclohexyl peroxide with a liquid carboxylic acid and strong acid catalyst. Also disclosed are new and useful improvements in the method for the preparation of 1 - hydroperoxy-1'-hydroxydicyclohexyl peroxide comprising reacting cyclohexanone with aqueous hydrogen peroxide and a strong acid catalyst.

BACKGROUND OF THE INVENTION

This invention relates to cyclic peroxides and is more particularly concerned with tricyclohexylidene peroxide and dicyclohexylidene peroxide and method of producing same.

Tricyclohexylidene peroxide may be prepared by treatment of cyclohexanone with hydrogen peroxide (aqueous, 30 percent by weight) and an acid catalyst. This method gives low yields, usually less than 50 mole percent, and is difficult to control thermally. If the temperature is not carefully controlled, the reaction can become vigorously and violently exothermic, expelling the reaction mixture from an open reaction vessel. The preparation can, therefore, be dangerous, especially on a large scale.

We have described in an application for U.S. Letters Patent application, entitled "Method of Producing Mixed Tricycloalkylidene Peroxides and Mixed Dicyclohexylidene Peroxides," Ser. No. 842,689, filed July 17, 1969, by Paul R. Story et al., now abandoned, improved method of preparation of tricyclohexylidene peroxide involving the treatment of 1,1'-dihydroperoxydicyclohexyl peroxide with cyclohexanone and an acid catalyst in carboxylic acid solvents. This method proved to be an improvement over the above method in that higher yields were obtained and the reaction could easily be safely controlled.

Dicyclohexylidene peroxide may be prepared by the treatment of cyclohexanone with hydrogen peroxide and an acid catalyst in acetic acid solvent. The product yields by this method are quite low, approximately 14 percent. Dicyclohexylidene peroxide may also be prepared by the treatment of cyclohexanone with hydrogen peroxide and perchloric acid catalyst in acetonitrile solvent. The yield by this method is only about 60 percent and requires lengthy reaction times and is dangerous, especially for large scale reactions because it is non-aqueous. Furthermore, it is less feasible economically than the method of this invention.

1-hydroperoxy-1'-hydroxydicyclohexyl peroxide may be prepared by the treatment of cyclohexanone with hydrogen peroxide and an acid catalyst in reasonably good yields. The method of the present invention however is safer in that about 15 percent aqueous hydrogen peroxide is used and the yield is higher, being nearly quantitative.

SUMMARY OF THE INVENTION

Briefly described, the present invention is a method of producing a mixture of tricyclohexylidene peroxide and dicyclohexylidene peroxide or dicyclohexylidene peroxide alone comprising reacting a peroxide selected from the group consisting of 1-hydroperoxy-1'-hydroxydicyclohexyl peroxide and 1,1'-dihydroperoxydicyclohexyl peroxide with a strong acid catalyst. In this method, the strong acid catalyst is added to a vigorously agitated mixture of the peroxide and an organic solvent. In a modified form of the invention, the strong acid catalyst is added to a solvent of the peroxide and a liquid carboxylic acid. By this latter method essentially pure tricyclohexylidene peroxide is produced. Also, the present invention discloses a new and useful improvement in the preparation of 1-hydroperoxy-1'-hydroxydicyclohexyl peroxide comprising reacting cyclohexanone with aqueous hydrogen peroxide and a strong acid catalyst at low temperature.

It is, therefore, the primary object of the present invention to provide an improved method for the production of tricyclohexylidene peroxide, dicyclohexylidene peroxide, and mixtures thereof, and 1-hydroperoxy-1'-hydroxydicyclohexyl peroxide.

A further object of the present invention is to provide a method for the production of the three above compounds which method is safe and easily controlled and provides for improved yields.

An additional object of the present invention is to provide a method for the production of the above compounds with a very simple work-up procedure.

Another object of this invention is to provide a method for the production of tricyclohexylidene peroxide and dicyclohexylidene peroxide directly into a suitable solvent for their conversion to macrocyclic compounds.

DETAILED DESCRIPTION OF THE INVENTION

Generally, the objects of this invention are achieved by reacting 1-hydroperoxy-1'-hydroxydicyclohexyl peroxide, best prepared by the method described herein, or 1,1'-dihydroperoxy-dicyclohexyl peroxide either with an organic solvent and a strong acid catalyst or with a liquid carboxylic acid and a strong acid catalyst.

One method of this invention is to mix 1-hydroperoxy-1'-hydroxydicyclohexyl peroxide with an organic solvent such as pentane, hexane, hexanes, benzene, toluene, xylene, ether, carbon tetrachloride, chloroform, cyclohexane, heptane, decane, cyclodecane, nonane, undecane, dodecane, or acetonitrile. Generally, the 1-hydroperoxy-1'-hydroxydicyclohexyl peroxide is only very slightly soluble in the solvent. To this vigorously agitated mixture, which is held at a temperature between about —78° C. and about +50° C., a strong mineral or organic acid catalyst is added, such as sulfuric, nitric, perchloric, p-toluenesulfonic, hydrochloric, or phosphoric acid. The acid catalyst may also be introduced in the gaseous state, as for example, anhydrous hydrogen chloride, sulfur trioxide, or sulfur dioxide.

After approximately 1.5 to approximately 3.0 hours, a clear aqueous layer and a clear organic solution results. The bottom aqueous layer is then removed and the organic layer is washed with water, then with a sodium hydroxide solution and then washed with water again.

The ratio of tricyclohexylidene peroxide to dicyclohexylidene peroxide produced and contained in the organic solution is controlled predominately by the temperature of the reaction and the amount of water the starting 1-hydroperoxy-1'-hydroxydicyclohexyl peroxide contains. Tricyclohexylidene peroxide is favored by lower temperatures and higher water content in the 1-hydroperoxy-1'-hydroxydicyclohexyl peroxide. If the 1-hydroperoxy1'-hydroxydicyclohexyl peroxide is completely dry, only dicyclohexylidene peroxide is obtained.

By the other method of this invention, 1-hydroperoxy-1'-hydroxydicyclohexyl peroxide is added to a liquid carboxylic acid, as for example acetic acid, formic acid, propionic acid, or butyric acid, at room temperature with stirring. To this agitated mixture is added a catalytic quantity of a strong acid or acid anhydride such as hydrochloric acid, sulfuric acid, 70 percent perchloric acid, p-toluenesulfonic acid, nitric acid, or phosphoric acid. The mixture is stirred at ambient temperature for 1 to several hours, after which a large excess of water is added to precipitate the tricyclohexylidene peroxide. The solid peroxide so precipitated is collected, filtered, and washed. By this method, the product is principally tricyclohexylidene peroxide with little or no dicyclohexylidene peroxide obtained.

The 1-hydroperoxy - 1' - hydroxydicyclohexyl peroxide used in this method may or may not be dry. In fact, the preferred method is to use wet 1-hydroperoxy-1'-hydroxydicyclohexyl peroxide material which contains about 50–300 percent water by weight. The relative amount of liquid carboylic acid may vary over a wide range; as for example, the reaction is satisfactory with so little acetic acid that a slurry is formed or sufficient acetic acid may be used with the 1-hydroperoxy-1'-hydroxydicyclohexyl peroxide is completely dissolved.

Yet another variation of this invention involves the replacement of 1-hydroperoxy - 1' - hydroxydicyclohexyl peroxide with 1,1'-dihydroperoxydicyclohexyl peroxide. The 1,1'-dihydroperoxydicyclohexyl peroxide may be substituted in all the procedures described above and used in exactly the same fashion. As with the -hydroperoxy-1'-hydroxydicyclohexyl peroxide, the product ratios depend upon the amount of water contained in the starting peroxide. Generally, the preferred starting material is the 1-hydroxy - 1' - hydroxydicyclohexyl peroxide because it gives higher yields of tricyclohexylidene peroxide and di- cyclohexylidene peroxide and because it is less hazardous to use by virtue of its lower shock sensitivity.

The reaction in the above-described methods are more easily controlled than previous methods for the preparation of tri- and dicyclohexylidene peroxide. This is particularly true in the synthesis of tricyclohexylidene peroxide. The reaction of the starting peroxide compound and the organic solvent or carboxylic acid with the strong acid catalyst does not become vigorously exothermic during any stage of the method. Also, the methods described above do not require expensive and hazardous solvents as do some of the previous methods. The methods of the invention offer maximum safety in that the starting peroxide compounds are usually wet and are therefore not sensitive to shock.

The 1 - hydroperoxy-1'-hydroxydicyclohexyl peroxide used in this invention is prepared by reacting cyclohexanone with 15 percent aqueous hydrogen peroxide and a strong acid catalyst and stirring the mixture at temperatures near ambient or below, optimally at about $-15°$ C. The reaction mixture forms a near solid mass which may be filtered and washed free of the strong acid catalyst; or more preferably, the excess water may be decanted and the crude peroxide used in the conversions described herein of tricyclohexylene peroxide and dicyclohexylidene peroxide. The dilute aqueous hydrogen peroxide provides a safer method for the preparation of 1-hydroperoxy-1'-dicyclohexyl peroxide than previously existed.

Tricyclohexylidene peroxide is useful for the production by pyrolysis of cyclopentadecane and 16-hexadecanolide. Cyclopentadecane is readily oxidized to cyclopentadecanone, a valuable musk compound. 16-hexadecanolide is also a valuable musk compound. By pyrolysis, dicyclohexylidene peroxide will produce 11-undecanolide and cyclodecane. 11-undecanolide is used as an artificial butter flavor, and the cyclodecane, by standard oxidation methods, can be converted to 10-decanolide which is also useful as an artificial butter flavor. In addition, these materials are useful as monomers for generating elastomeric polyurethane materials. Furthermore, the compounds of this invention have from preliminary tests shown antiparasitic and particularly anti-malarial activity. The di- and tricyclohexylidene peroxides also can be converted into macrocyclic compounds according to U.S. Letters Patent application, entitled "Macrocyclic Compounds," Ser. No. 697,593, filed Jan. 15, 1968, by Paul R. Story, now U.S. Pat. 3,528,898; divisional application entitled "A Process for the Preparation of Macrocyclic Compounds by Photolytic Decomposition of Cyclic Ketone Peroxides," filed Jan. 15, 1968, by Paul R. Story; and U.S. Letters Patent application, entitled "Macrocyclic Compounds," Ser. No. 842,739, filed July 17, 1969, by Paul R. Story et al. and now abandoned.

A better understanding of the present invention will be had by reference to the following specific examples of carrying out the present invention.

EXAMPLE 1

A mixture of 5.6 kg. of wet, crude 1-hydroperoxy-1'-hydroxydicyclohexyl peroxide still containing some hydrochloric acid (this amount of wet peroxide is equivalent to 3.6 kg. of dry 1-hyroperoxy-1'-hydroxydicyclohexyl peroxide) and 21.5 liters hexane was cooled with stirring to $-15°$ C. Hydrogen chloride was bubbled into the vigorously agitated mixture at a rate such that the temperature of the mixture did not rise above $+5°$ C. After approximately 1.5 to 2.0 hours, the white solid material had disappeared leaving a clear aqueous layer and a clear hexane solution. The bottom aqueous layer was drained off and the hexane solution was washed twice with 20 liters of water, once with 10 liters of 8 percent sodium hydroxide solution (aqueous) and, finally, with 20 liters of water. The ratio of tricyclohexylidene peroxide to dicyclohexylidene peroxide in the hexane solution was about 3:1 by infrared spectral analysis and GC-analysis of the decomposition products.

Evaporation of the solvent from an aliquot of the solution and extrapolation over the total solution volume indicated a yield of 2.3 kg. (96 percent) of tricyclohexylidene peroxide and dicyclohexylidene; yield based on 1-hydroperoxy-1'- hydroxydicyclohexyl peroxide. Pyrolysis of this solution at 200° C. and 250 p.s.i.g. produced a crude pyrolysate which yielded after fractionation, cyclodecane (15 mole percent), 11-undecanolide (6 mole percent), cyclopentadecane (22.4 mole percent), and 16-hexadecanolide (9.2 mole percent), yields based on 1-hydroperoxy-1'-hydroxydicyclohexyl peroxide.

EXAMPLE 2

The procedure of Example 1 was repeated except that the 1 - hydroperoxy-1'-hydroxydicyclohexyl peroxide was washed free of hydrochloric acid before use. The yield of tricyclohexylidene peroxide plus dicyclohexylidene peroxide was 89 percent; the ratio of the two peroxidic products was approximately the same as in Example 1.

EXAMPLE 3

A mixture of 7 ml. of concentrated hydrochloric acid and 7 ml. of concentrated sulfuric acid was added dropwise to a stirred mixture of 50 g. of 1-hydroperoxy-1'-hydroxydicyclohexyl peroxide and 200 ml. of hexane at room temperature. The reaction mixture became clear after twelve hours and was worked up as in Example 1. Pyrolysis of the hexane solution gave yields of cyclopentadecane, 16 - hexadecanolide, cyclodecane, and 11-undecanolide with yields comparable to those in Example 1.

EXAMPLE 4

To a mixture of 50 g. of wet 1-hydroperoxy-1'-hydroxydicyclohexyl peroxide (equivalent to 33.3 g. dry peroxide) and 400 ml. of hexane, 8 ml. of 70 percent perchloric acid was added with vigorous stirring. After 1.5 hours, the two-phase mixture cleared and after work up according to Example 1, gave 29 g. of tricyclohexylidene peroxide (96 percent yield). It was demonstrated that the reaction time decreased with increasing acid concentration.

EXAMPLE 5

The procedure of Example 4 was repeated with 76 g. of wet 1 - hydroperoxy-1'-hydroxydicyclohexyl peroxide (equivalent to 50.6 g. of dry peroxide) and 400 ml. of hexane and 8 ml. of 70 percent sulfuric acid to give 44.2 g. of peroxide product which was mainly tricyclohexylidene peroxide but also contained a small amount of unreacted starting material.

EXAMPLE 6

The procedure of Example 4 was repeated using 59.9 g. of dry 1-hydroperoxy-1'-hydroxydicyclohexyl peroxide in 717.4 ml. of hexane and 14.3 ml. of 70 percent perchloric acid to yield 44 g. of dicyclohexylidene peroxide (79.6 percent). It has been shown that the tricyclohexylidene/dicyclohexylidene peroxide ratio in the product decreases with decreasing amounts of water in the starting 1-hydroperoxy-1'-hydroxydicyclohexyl peroxide.

EXAMPLE 7

The procedure of Example 4 was repeated using 56.5 g. of wet 1-hydroperoxy-1'-hydroxydicyclohexyl peroxide (35.4 g. dry peroxide), 350 ml. of benzene, and 5 ml. of 70 percent perchloric acid. The reaction time required to give a clear mixture was 3 hours. The yield of tricyclohexylidene peroxide was 21.9 g. (65.7 percent).

EXAMPLE 8

A mixture of 8 kg. of 1-hydroperoxy-1'-hydroxydicyclohexyl peroxide (equivalent to 4.6 kg. of dry peroxide), 25 liters of glacial acetic acid and 3.2 liters of 10 percent perchloric acid in acetic acid was stirred for one hour at room temperature. After this time, a large excess of water was added to give a white precipitate which, after filtering and washing, gave 3.075 kg. of wet tricyclohexylidene peroxide (1.711 kg. of dry trimer), a 40 percent yield.

EXAMPLE 9

A mixture of 6 liters of cyclohexanone, 1 liter of concentrated hydrochloric acid (37 percent), 5.94 liters of 30 percent hydrogen peroxide and 4.5 liters of water was stirred for 1.5 hours in a cold bath at −20° C. and, subsequently, at 1.5 hours at room temperature. After this time, the reaction mixture became almost a solid mass. The mass was filtered and washed with water to give 13.44 kg. of wet 1-hydroperoxy-1'-hydroxydicyclohexyl peroxide which was shown to have a water content of 42.8 percent and therefore equivalent to 7.68 kg. of dry 1-hydroperoxy-1-hydroxydicyclohexyl peroxide (100 percent yield).

EXAMPLE 10

A suspension of 80 g. of wet 1-hydroperoxy-1'-hydroxydicyclohexyl peroxide in 400 ml. of hexane was heated to 50° C. At this temperature hydrogen chloride gas was bubbled into the suspension until it became clear; this required about 40 minutes. After cooling, the upper hexane layer was separated from the lower aqueous layer. Evaporation of the hexane yielded 31 g. of a white solid. Pyrolysis of this product in refluxing decane for 2.5 hours gave cyclodecane (20 percent yield), 11-undecanolide (8 percent) cyclopentadecane (1 percent), and 16-hexadecanolide (1 percent), thereby revealing that the peroxidic product consisted of a mixture of tricyclohexylidene peroxide and dicyclohexylidene peroxide, with the latter predominating.

EXAMPLE 11

A mixture of 80 g. of wet 1-hydroperoxy-1'-hydroxydicyclohexyl peroxide and 400 ml. of hexane was cooled by means of an acetone-Dry Ice bath, to −78° C. Hydrogen chloride gas was bubbled through this cooled solution for a period of 4 hours. After this time only about 20 percent of the 1-hydroperoxy-1'-hydroxydicyclohexyl peroxide had been consumed. After filtering, the resulting clear hexane solution was evaporated to give an oil. Pyrolysis of this oil in refluxing decane for 1.5 hours gave cyclodecane (5 percent yield), 11-undecanolide (3 percent), cyclopentadecane (8 percent), and 16-hexadecanolide (7 percent), thereby revealing the oil to consist of a mixture of tricyclohexylidene peroxide and dicyclohexylidene peroxide with the former predominating.

EXAMPLE 12

80 g. of wet 1-hydroperoxy - 1' - hydroxydicyclohexyl peroxide was dissolved in 250 ml. of butyric acid and stirred for 4 hours at room temperature. After this time a large excess of water was added yielding 102 g. of wet peroxide which consisted of a mixture of dicyclohexylidene peroxide and tricyclohexylidene peroxide. Repetition of the above experiment substituting propionic acid for butyric resulted in the formation of 73.5 g. of wet peroxide, which again was a mixture of dicyclohexylidene peroxide and tricyclohexylidene peroxide.

EXAMPLE 13

50 g. of 1,1'-dihydroperoxydicyclohexyl peroxide was placed in a flask and 400 ml. of hexane was added. HCl was bubbled through the suspension at room temperature till it became clear (15 min.) and then for 45 more minutes while the mixture was cooled down to +5° C. The hexane layer was evaporated and the remaining oil thermolyzed in decane. It was checked by GC. Small yields of cyclopentadecane and 16-hexadecanolide were obtained.

The following are the physical constants and characteristics for tricyclohexylidene peroxide and dicyclohexylidene peroxide produced by the method of the present invention. The best analytical tool to recognize and determine trimeric and dimeric cycloketone peroxides is their thermal decomposition to macrocyclic compounds; the peroxides themselves cannot be described adequately because they are oils and are not pure.

(1) Tricyclohexylidene peroxide.—When recrysallized from methanol, it has a melting point of 91–92° C. After thermal decomposition, tricyclohexylidene yields cyclopentadecane (25 percent) and 16-hexadecanolide (15 percent).

(2) Dicyclohexylidene peroxide.—When recrystallized from methanol, it has a melting point of 128–129° C. After thermal decomposition, dicyclohexylidene peroxide yields cyclodecane and 11-undecanolide.

Other variations falling within the scope of the present invention will suggest themselves to those skilled in the art.

What is claimed as invention is:

1. A method for the preparation of tricyclohexylidene peroxide comprising forming a reaction medium consisting essentially of a liquid carboxylic acid selected from the group consisting of acetic acid, formic acid, propionic acid and butyric acid and a peroxide selected from the group consisting of 1-hydroperoxy-1'-hydroxydicyclohexyl peroxide and 1,1'-dihydroperoxydicyclohexyl peroxide, adding with agitation to the thus-formed reaction medium a strong acid catalyst selected from the group consisting of hydrochloric acid, sulfuric acid, perchloric acid, p-toluene sulfonic acid, nitric acid and phosphoric acid, stirring the resulting reaction mixture at ambient or room temperature for one to several hours and adding water thereto to precipitate tricyclohexylidene peroxide as the reaction product.

References Cited

T. Ledaal: Acta Chem. Scand., 21 (1967), No. 6, pp.

E. G. E. Hawkins: Jour. Chem. Soc., C Org. (1969) 1656–7.

NORMA S. MILESTONE, Primary Examiner

U.S. Cl. X.R.

260—343, 610 R, 666 P

UNITED STATES PATENT OFFICE
CERTIFICATE OF CORRECTION

Patent No. 3,781,303　　　　Dated December 25, 1973

Inventor(s) Paul R. Story and Peter Busch

It is certified that error appears in the above-identified patent and that said Letters Patent are hereby corrected as shown below:

Column 3, line 35, "-hydroperoxy-1'-" should correctly read -- 1-hydroperoxy-1'- --

Column 8, under "References Cited", the references should correctly read:

-- T. Ledaal, Acta Chem. Scand. 21 (1967) No. 6, pp. 1656-7.

E.G.E. Hawkins, Jour. Chem. Soc., C Org. (1969) (19) pp. 2691-7. --

Signed and sealed this 11th day of June 1974.

(SEAL)
Attest:

EDWARD M. FLETCHER, JR.
Attesting Officer

C. MARSHALL DANN
Commissioner of Patents